United States Patent
Bennewitz et al.

(10) Patent No.: US 6,956,226 B2
(45) Date of Patent: Oct. 18, 2005

(54) LIGHT IMAGE SENSOR TEST OF OPTO-ELECTRONICS FOR IN-CIRCUIT TEST

(75) Inventors: Hans Jurgen Bennewitz, Auburn, CA (US); Robert Louis Meyers, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 10/346,046

(22) Filed: Jan. 15, 2003

(65) Prior Publication Data

US 2004/0135107 A1    Jul. 15, 2004

(51) Int. Cl.[7] .................................. G01N 21/86
(52) U.S. Cl. ................ 250/559.29; 324/501; 324/767
(58) Field of Search ................. 250/559.29, 221, 250/559.44; 324/501, 767, 753, 750; 356/247, 356/248, 251–255; 257/81–85; 382/145

(56) References Cited

U.S. PATENT DOCUMENTS

| | | | |
|---|---|---|---|
| 3,806,256 A * | 4/1974 | Ishak | 356/446 |
| 4,684,801 A * | 8/1987 | Carroll et al. | 250/221 |
| 4,731,855 A * | 3/1988 | Suda et al. | 382/149 |
| 4,808,815 A * | 2/1989 | Langley | 250/227.28 |
| 4,972,501 A * | 11/1990 | Horyu | 382/114 |
| 4,986,662 A * | 1/1991 | Bures | 356/621 |
| 5,548,106 A * | 8/1996 | Liang et al. | 235/454 |
| 5,572,444 A * | 11/1996 | Lentz et al. | 702/117 |
| 6,525,819 B1 * | 2/2003 | Delawter et al. | 356/406 |

* cited by examiner

Primary Examiner—Thanh X. Luu

(57) ABSTRACT

A method for testing at least one light source on a printed circuit assembly, includes: detecting a light signal from a plurality of light sources on a printed circuit assembly; generating a plurality of electrical analog signals from an image array, in response to each of the detected light signals; multiplexing the plurality of electrical analog signals; digitizing the multiplexed electrical analog signals; and light signals from the image array; and verifying each of the electrical signals in a sequential manner.

19 Claims, 4 Drawing Sheets

LIGHT IMAGE SENSOR TEST OF OPTO-ELECTRONICS FOR IN-CIRCUIT TEST

TECHNICAL FIELD

Embodiments of the present invention relate generally to test tools for printed circuit assemblies.

BACKGROUND

An In-Circuit Test (ICT) process electrically verifies the individual component placement on a printed circuit assembly (PCA). During the ICT process, the verification of light sources is a critical operation that is commonly overlooked due to difficulty and expense. Light source components (typically Light Emitting Diodes or LEDs) provide critical information to the end-user to indicate a warning, fault status, or safe operation.

Currently, there are two major designs for validating optical devices. The LIGHTPROBE™ product from OPTO-MISTIC PRODUCTS, Concord, Mass. and the FINN™ product from TEST COACH CORPORATION, Hoffman Estates, Ill., are devices that are tuned to validate a specific color source. However, both of the above devices have high maintenance costs due to their fragile nature. Also, both devices utilize custom sensors that are not readily available as "off-the-shelf" components, and this typically results in a long lead time for each unit that is ordered. Both devices are not able to provide consistent results when observing amber and green light sources. Both devices detect only one color (i.e., the devices are single wavelength dependent) and detect only one light source. It is very expensive to verify a light source by a single sensor. Typically, the cost to verify each light source is about $200 to $400. Additionally, the LIGHTPROBE™ product requires calibration prior to installation and may drift with age.

Additionally, both of the above devices require critical alignment with the light source. The LIGHTPROBE product must typically be placed less than about 0.05 inches from the light source, while the FINN product must be typically placed less than 0.15 inches from the light source.

Thus, the current approaches and/or technologies are limited to particular applications and/or suffer from various constraints.

SUMMARY OF EMBODIMENTS OF THE INVENTION

At least some of the various embodiments are now described. In one embodiment of the invention, a light image sensor for testing opto-electronics for in-circuit test, includes:

an image array configured to detect a light signal from a light source on a printed circuit assembly and generate an electrical analog signal in response to a detected light signal;

a sampling stage configured to sample the electrical analog signal from the image array;

an analog-to-digital converter configured to digitize the electrical analog signal from the image array into a digital signal for testing by an in-circuit test unit.

In another embodiment of the invention, an apparatus for testing at least one light source on a printed circuit assembly, includes:

a lens configured to detect a light signal from at least one light source;

an image array configured to detect the light signal that passes through the lens and generates an electrical analog signal in response to a detected light signal;

a sampling stage configured to sample the electrical analog signal from the image array, the sampling stage including a multiplexer configured to multiplex a plurality of light signals from the image array;

an analog-to-digital converter configured to digitize the electrical analog signal into a digital signal for testing by an in-circuit test unit, where the in-circuit test unit can test light signals in a sequential manner.

In yet another embodiment of the invention, a method for testing opto-electronics for in-circuit test, includes:

detecting a light signal from a light source on a printed circuit board by use of an image array and generating an electrical analog signal in response to a detected light signal;

sampling the electrical analog signal from the image array; and digitizing the electrical analog signal into a digital signal for testing by an in-circuit test unit.

In yet another embodiment, a method for testing at least one light source on a printed circuit board, includes:

detecting a light signal from a plurality of light sources on a printed circuit board;

generating a plurality of electrical analog signals from an image array, in response to each of the detected light signals;

multiplexing the plurality of electrical analog signals;

digitizing the multiplexed electrical analog signals; and light signals from the image array; and verifying each of the electrical signals in a sequential manner.

Other embodiments of the invention include, but are not limited to, the various embodiments described below.

These and other features of an embodiment of the present invention will be readily apparent to persons of ordinary skill in the art upon reading the entirety of this disclosure, which includes the accompanying drawings and claims.

DETAILED DESCRIPTION OF PREFERRED EMBODIMENTS

Figure 1:
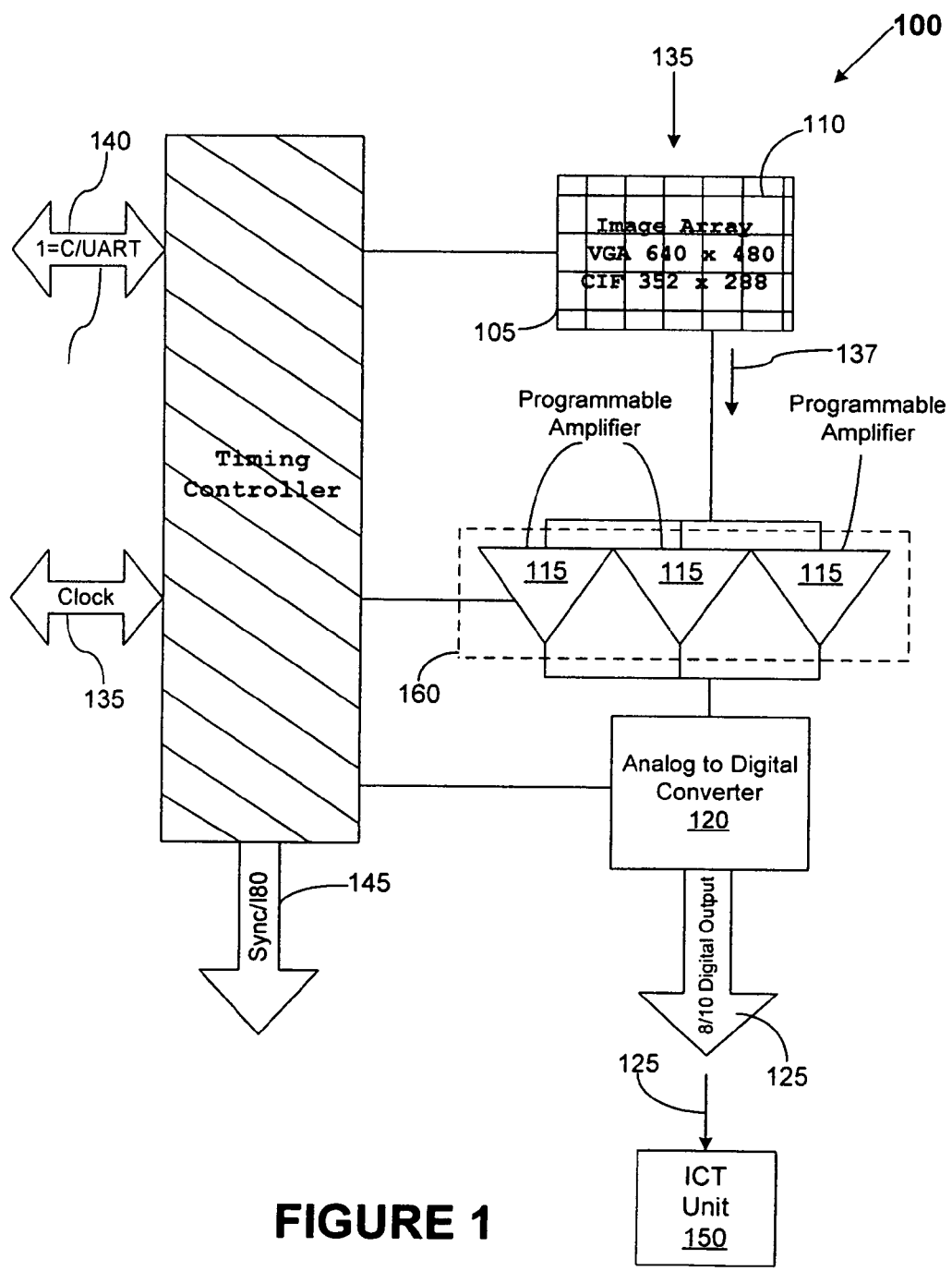
FIG. 1 is a block diagram illustrating a light image sensor for opto-electronics, in accordance with an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention advantageously detects the presence of any color in the visible spectrum, where the color is from an optical source (such as an LED) that is placed on a PCA. An embodiment of the invention can validate if the correct color and intensity has been displayed by each optical source on the PCA Other possible advantages provided by embodiments of the invention include the following.

1. In an embodiment, the same sensor can be used to detect colors from a cluster (e.g., array) of light sources or multiple light sources.
2. Embodiments of the sensor typically cost less than half of the cost of other designs. For example, the sensor can be used to cover multiple light sources, and this leads to a very significant cost savings. As another example, embodiments of the sensor advantageously do not need customized components and can be formed by off-the-shelf components.
3. Embodiments of the sensor do not require internal calibration and have a rugged mechanical design.
4. Embodiments of the sensor permit a low maintenance cost.
5. Embodiments of the sensor are compact and small in size (e.g., 11 millimeters by 11 millimeters).
6. Embodiments of the sensor permit the alignment to a light source (and the distance to a light source) to be less critical as compared to current sensors.
7. Embodiments of the sensor have a very small footprint (e.g., about 10 millimeters by 10 millimeters).
8. Embodiments of the sensor can provide a fast response time (e.g., about 15 frames per second with VGA quality/resolution).
9. Embodiments of the sensor can provide extended detection resolution 640×480 pixels.
10. Embodiments of the invention provide programmability for window size, panning, and gain, and these programmable features are not easily provided by current test tools.

The use of a CMOS (complementary metal oxide semiconductor) active pixel image sensor, in one embodiment of the invention, will allow testing of light sources that are placed on a printed circuit assembly (PCA), and will validate the correct color and intensity of each light source. The single CMOS image sensor can detect all visible light output from opto-electronic devices, regardless of the color output of an opto-electronic device. The CMOS image sensor can advantageously detect and verify multiple light sources on the same PCB. The CMOS image sensor is more efficient, less expensive, easier to use and maintain, and has a smaller footprint than previous tools for testing PCBs.

FIG. 1 is a block diagram illustrating a light image sensor 100 for opto-electronics, in accordance with an embodiment of the invention. The elements in sensor 100, as shown in FIG. 1 may be implemented as discrete components or may be components integrated in a semiconductor package. The sensor 100 includes an image array (105) for capturing light signals. A representative CMOS image array is integrated into the ADCS-2021 manufactured by Agilent Technologies. The image array 105 can include a plurality of conventional charge coupled device ("CCD") sensors 110. Alternatively, the sensors 110 can be complementary metal oxide semiconductor (CMOS) sensors, which are generally much less expensive than CCD sensors, but may be more susceptible to noise. Other types of sensors may be used in the image array 105. The size of the image array 110 is typically 640×480 to permit VGA resolution. In response to a detected light signal 135 from a light source, the image array 105 will generate an analog electrical signal 137 that has a coded value indicating the color and intensity of the detected light signal 135.

One or more programmable amplifiers 115 are coupled to the image array 110. The amplifiers 115 provide a suitable gain to improve signal to noise ratio to the electrical signals 137 generated by the image array 105.

An analog-to-digital converter (A/D converter) 120 converts the analog signals 137 from the image array 105 into digital signals 125. The A/D converter function is integrated into the Agilent ADCS-2021 CMOS image sensor device from Agilent Technologies, Palo Alto, Calif., for example.

The sensor 100 further includes a timing controller 130 for providing proper synchronization between the output of the image array 105 and the output of the A/D converter 120. Typically, the A/D converter 120 has, for example, a 10-bit parallel output. The timing controller function is integrated into the Agilent ADCS-2021 CMOS image sensor device, for example.

A conventional clock source (not shown in FIG. 1) provides clock signals 135 to the timing controller 130.

The Agilent ADCS-2021 CMOS image censor provides an I2C serial bus interface 140 to facilitate external read and write of the ADCS-2021 internal registers. The bus interface 140 is a summation of an output bus (DRDY, nFRAME_nSYNC, nROW, nIRQ_nCC).

A conventional ICT unit 150 receives the digital signals 125 for analysis to determine if the light signals 135 from a light source match a proven value for a color. The ICT unit 150 can also detect the values of the digital signals 125 in order to determine the intensity of a light signal 135 from a light source. One suitable ICT unit 150 is the 3070 ICT from Agilent Technologies.

In an embodiment, the sensor 100 includes a sampling stage 160 that reads the analog output 137 of the image array 105. In one embodiment, the sampling stage 160 utilizes a Bayer filter pattern and an alternating pixel pattern of red, green, and blue. The Bayer filter pattern is typically used in the majority of today's consumer digital cameras. The Bayer filter pattern alternates a row of red and green filters with a row of blue and green filters to create an image that the human eye will perceive as a true color. As the image array 105 in the sensor 100 records the light image 135, each pixel is translated into an electronic signal that can be ported via the analog-to-digital converter (ADC) 120 to the ICT unit 150. This electronic signal (converted by ADC 120 to a digital signal 125) is analyzed by the In-Circuit Tester unit 150 to determine whether the results agree with the proven value for each color. Conventional software tools are typically used by the ICT unit 150 to analyze the signal 125 so that the color and intensity of the light source is determined or validated.

The sampling stage 160 advantageously permits programmability for window size, panning, and gain, and these programmable features are not easily provided by current test tools. Thus, to select the window size, or to change panning and/or gain, the sampling stage 160 will sample particular subsets of the sensing elements 110 in the image array 105.

It is further noted that the sampling stage 160 can be implemented in or integrated in the image array 110.

Figure 2:
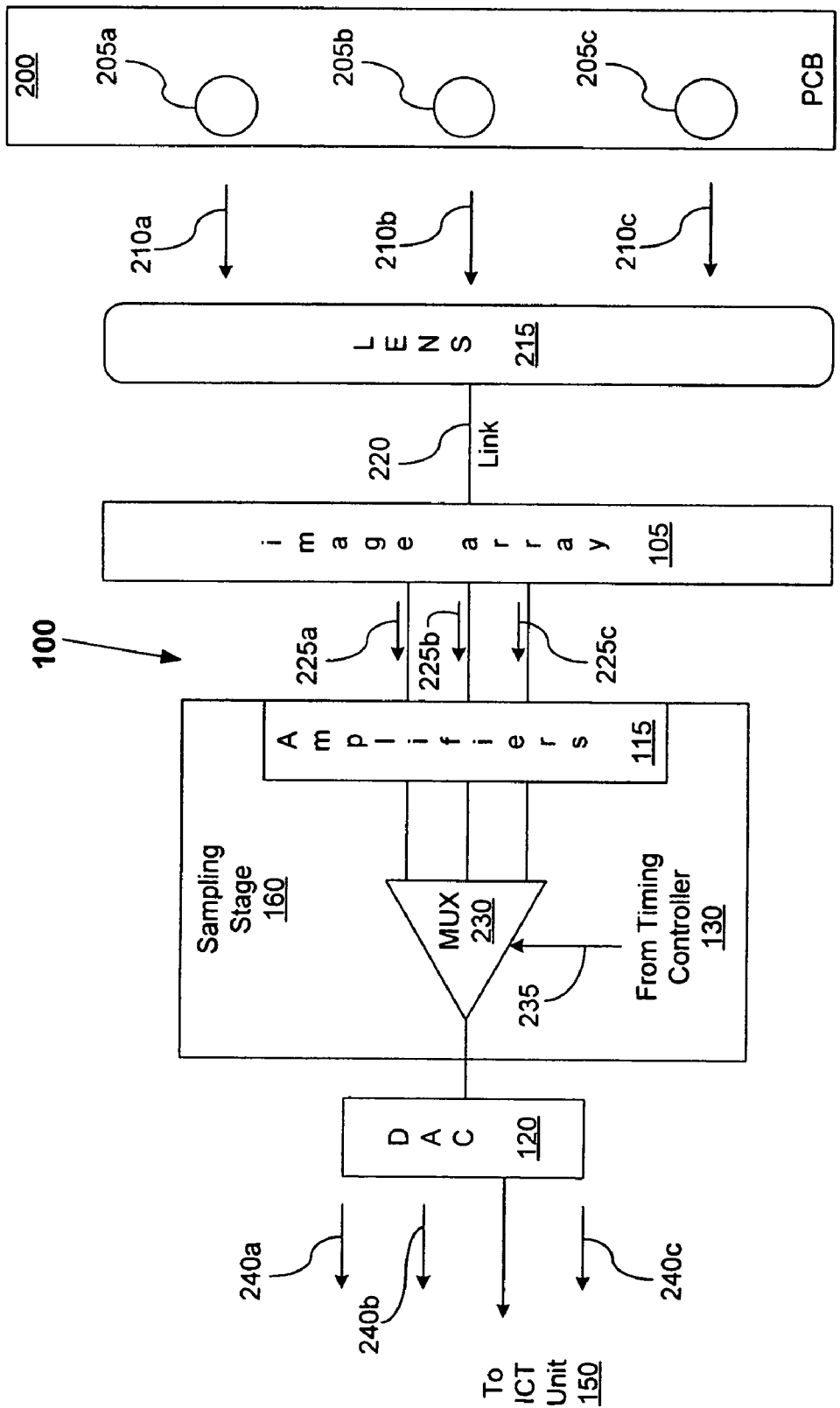
FIG. 2 is a block diagram illustrating an operation of sequentially sampling light signals from a plurality of light sources, in accordance with an embodiment of the invention.

FIG. 2 is a block diagram illustrating an operation of sequentially sampling light signals from a plurality of light sources, in accordance with an embodiment of the invention. A PCA 200 may support, for example, a plurality of light sources 205a, 205b, and 205c. The number of light sources and types of light sources (e.g., LEDs) may vary. The light sources emit light signals 210a, 210b, 210c, respectively. A lens 215 is disposed from any suitable distance to receive the light signals 210a–210c. The lens 215 may be, for example, any general purpose lens. A link 220 (which is typically a fiber optic link) transmits the light signals 210a–210c to the image array 105. In response to detection of light signals 210a, 210b, and 210c, the image array will output electrical analog signals 225a, 225b, 225c, respectively. The electrical analog signals 225a–225c are amplified by amplifiers 115.

In an embodiment of the invention, a multiplexer 230 will multiplex the signals 225a–225c so that the signals 225a–225c are output in a sequential manner by the sampling stage 160 to the A/D converter 120. For example, a timing signal 235 (from the timing controller 130 in FIG. 1) will cause the multiplexer 230 to select signal 225a for output at time T1, to select signal 225b for output at time T2, and to select signal 225c for output at time T3. The output signals 225a, 225b, and 225c are then digitized by the A/D converter 120 into digital signals 240a, 240b, and 240c, respectively. This multiplexing feature is integrated within the ADCS-2021 CMOS image sensor from Agilent Technologies, for example.

As a result, the multiplexer 230 permits the ICT unit 150 (FIG. 1) to receive the output signals 225a, 225b, 225c (as digital signals 240a, 240b, and 240c, respectively) in a sequential manner. Therefore, the ICT unit 150 can sequentially analyze the color and/or intensity of the light signals 210a, 210b, and 210c from the multiple light sources 205a, 205b, 205c, respectively, and this capability leads to the cost reductions that were mentioned above.

In contrast, in one previous approach, U.S. Pat. No. 4,808,815 issued to Frank J. Langley, discloses a probe for testing the optical functions of a wide variety of light-emitting devices and displays. However, U.S. Pat. No. 4,808,815 does not disclose the use of fiber optics for coupling to a lens and also teaches away from using a CCD sensor.

Figure 3:
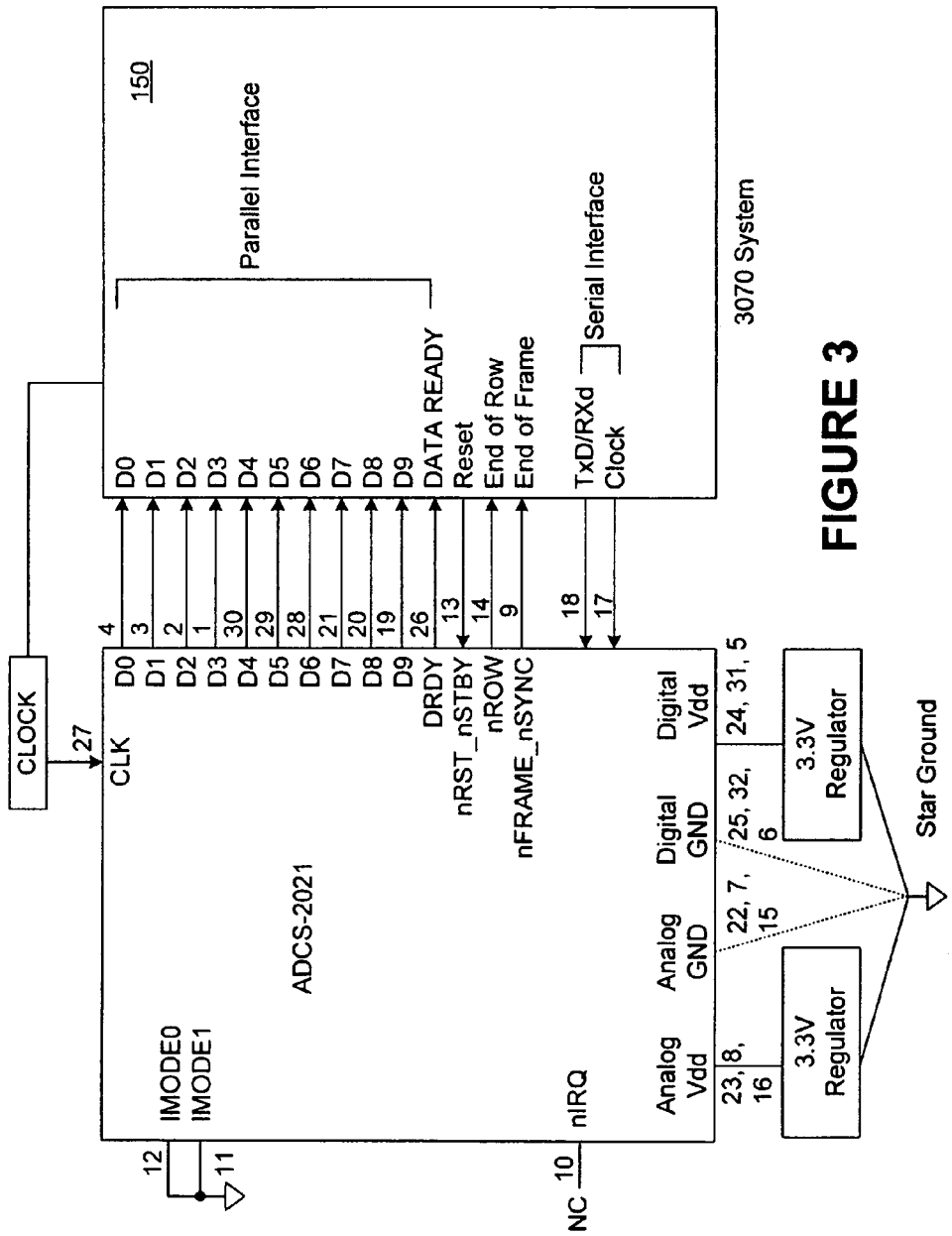
FIG. 3 is a block diagram illustrating the interface between an ICT unit and a sensor, in accordance with an embodiment of the invention.

IN FIG. 3, the following signals embody the hardware interface between the CMOS image sensor and the ICT tester. Signals D0–D9 are the digital data bits output from the CMOS image sensor. DRDY is a handshaking bit that alerts the ICT tester that data is ready. NRst_nSTBY is a signal input from the ICT tester to the CMOS image censor to initiate a reset or to place the device in standby mode. nROW (END of Row) and nFRAME_nSYNC (END of FRAME) signal end of row and end of frame respectively to the ICT tester. The clock signal, pin 17, is an I2C, 100 khz, SCLK that acts as a transfer sequencer of the data, SDATA_TxD which is pin 18 in FIG. 3

Figure 4:
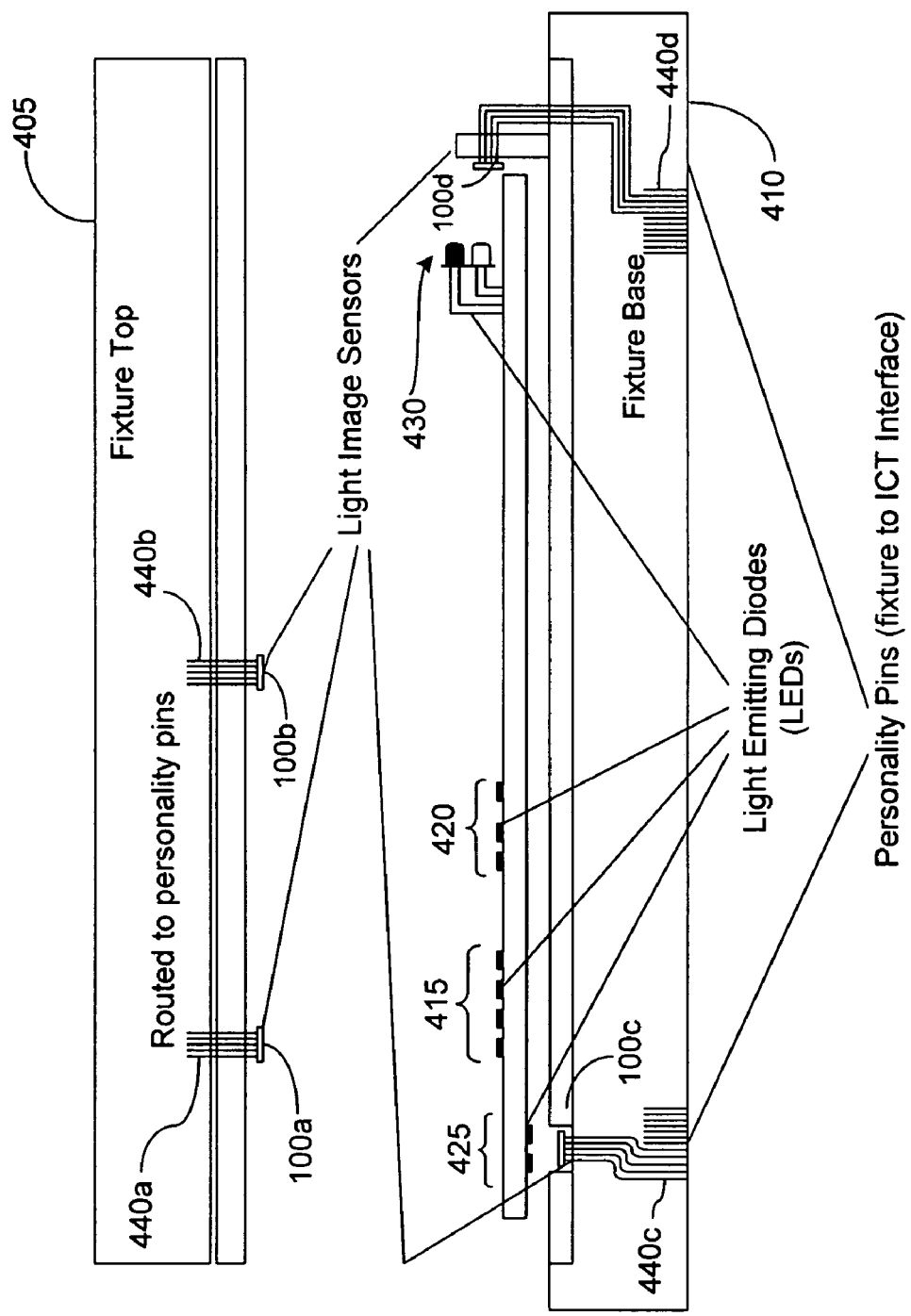
FIG. 4 is a block diagram illustrating light images sensors as attached to a fixture, in accordance with an embodiment of the invention.

FIG. 4 is a block diagram illustrating light images sensors as attached to a fixture, in accordance with an embodiment of the invention. The sensors 100a, 100b, 100c, and 100d are similar in functions to the sensor 100 described in FIG. 1 and FIG. 2. A conventional fixture top 405 (of a fixture the an ICT interface) supports the sensors 100a and 100b, while a conventional fixture base 410 supports the sensor 100c. Typically, the sensor 100a will detect the LEDs in LED group 415, the sensor 100b will detect the LEDs in LED group 420, the sensor 100c will detect the LEDs in LED group 425, and the sensor 100d will detect the LEDs in LED group 430. The sensors 100a, 100b, 100c, and 100d are routed by wires 440a, 440b, 440c, and 440d, respectively, to personality pins which are fixture resource connections to an ICT interface to permit ICT testing of the LEDs.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A light image sensor for testing opto-electronics for in-circuit test, the sensor comprising:

an image sensor array configured to detect a light signal from a light source on a printed circuit assembly and generate an electrical analog signal in response to a detected light signal;
a sampling stage configured to sample the electrical analog signal from the image sensor array;
an analog-to-digital converter configured to digitize the electrical analog signal from the image sensor array into a digital signal for testing by an in-circuit test unit;
an in-circuit test (ICT) unit coupled to the analog-to-digital converter and configured to match a color of the digital signal with a proven color value and to match an intensity of the digital signal with a proven intensity value;
a lens coupled to the image sensor array and configured to receive the light signal from the light source; and
a fiber optic link coupled to the lens and to the image sensor array and configured for transmitting the light signal from the lens to the image sensor array.

2. The sensor of claim 1, further comprising:
a timing controller configured to provide timing signals to the sampling stage and analog-to-digital converter.

3. The sensor of claim 1, wherein the sampling stage includes at least one amplifier configured to amplify the electrical analog signal from the image sensor array.

4. The light image sensor of claim 1, wherein the sampling stage can sample a particular subset of sensing elements in the image sensor array.

5. An apparatus for testing at least one light source on a printed circuit board, the apparatus comprising:
a lens configured to receive a light signal from at least one light source;
an image sensor array configured to detect the light signal that passes through the lens and generate an electrical analog signal in response to a detected light signal;
a fiber optic link coupled to the lens and to the image sensor array and configured for transmitting the light signal from the lens to the image sensor array;
a sampling stage configured to sample the electrical analog signal from the image sensor array,
an analog-to-digital converter configured to digitize the electrical analog signal into a digital signal for testing by an in-circuit test unit, where the in-circuit test unit can test light signals in a sequential manner;
wherein the in-circuit test (ICT) unit is coupled to the analog-to-digital converter and configured to match a color of the digital signal with a proven color value and to match an intensity of the digital signal with a proven intensity value.

6. The sensor of claim 5, further comprising:
a timing controller configured to provide timing signals to the sampling stage and analog-to-digital converter.

7. The sensor of claim 5, wherein the sampling stage includes at least one amplifier configured to amplify the electrical analog signal from the image sensor array.

8. A method for testing opto-electronics for in-circuit test, the method comprising:
detecting a light signal from a light source, on a printed circuit assembly by use of an image sensor array and generating an electrical analog signal in response to a detected light signal;
sampling the electrical analog signal from the image sensor array;
digitizing the electrical analog signal into a digital signal for testing by an in-circuit test unit; and
matching a color of the digital signal with a proven color value and matching an intensity of the digital signal with a proven intensity value; and
receiving the light signal in a lens prior to detecting the light signal by use of the image sensor array; and
transmitting the light signal from the lens, along a fiber optic link, and to the image sensor array.

9. The method of claim 8, wherein matching a color of the digital signal with a proven color value and matching an intensity of the digital signal with a proven intensity value is performed by an in-circuit test (ICT) unit.

10. A method for testing at least one light source on a printed circuit assembly, the method comprising:
detecting a light signal from a plurality of light sources on a printed circuit assembly;
generating a plurality of electrical analog signals from an image sensor array, in response to each of the detected light signals;
multiplexing the plurality of electrical analog signals so that the electrical analog signals are output by a multiplexer in a sequential manner;
digitizing the multiplexed electrical analog signals into electrical digitized signals; and
verifying each of the electrical digitized signals in a sequential manner, wherein verifying of each of the digitized signals comprises matching a color of a digitized signal with a proven color value and matching an intensity of a digitized signal with a proven intensity value;
wherein a lens is coupled to the image sensor array and configured to receive the light signal from the light sources; and wherein a fiber optic link is coupled to the lens and to the image sensor array and configured for transmitting the light signal from the lens to the image sensor array.

11. The method of claim 10, wherein matching a color of the digital signal with a proven color value and matching an intensity of the digital signal with a proven intensity value is performed by an in-circuit test (ICT) unit.

12. The method of claim 10, further comprising:
receiving the light signal in a lens prior to detecting the light signal.

13. The method of claim 12, further comprising:
transmitting the light signal from the lens, along a fiber optic link, and to the image sensor array.

14. An apparatus for testing opto-electronics for in-circuit test, the apparatus comprising:
means for detecting a light signal from a light source on a printed circuit assembly by use of an image sensor array and generating an electrical analog signal in response to a detected light signal;
means for sampling the electrical analog signal from the image sensor array;
means for digitizing the electrical analog signal into a digital signal for testing by an in-circuit test unit;
wherein the in-circuit test unit comprises means for matching a color of the digital signal with a proven color value and for matching an intensity of the digital signal with a proven intensity value;
a lens coupled to the image sensor array and configured to receive the light signal from the light source; and
a fiber optic link coupled to the lens and to the image sensor array and configured for transmitting the light signal from the lens to the image sensor array.

15. The apparatus of claim 14, further comprising:
a lens coupled to the detecting means and configured to receive the light signal from the light source.

16. The apparatus of claim 15, further comprising:
a fiber optic link coupled to the lens and to the detecting means and configured for transmitting the light signal from the lens to the detecting means.

17. An apparatus for testing at least one light source on a printed circuit assembly, the apparatus comprising:
means for detecting a light signal from a plurality of light sources on a printed circuit assembly;
means for generating a plurality of electrical analog signals from an image sensor array, in response to each of the detected light signals;
means for multiplexing the plurality of electrical analog signals;
means for digitizing the multiplexed electrical analog signals into digital signals; and
means for verifying each of the electrical signals in a sequential manner, wherein the verifying means comprises means for matching a color of a digital signal with a proven color value and for matching an intensity of the digital signal with a proven intensity value;
a lens coupled to the image sensor array and configured to receive the light signal from the light sources; and
a fiber optic link coupled to the lens and to the image sensor array and configured for transmitting the light signal from the lens to the image sensor array.

18. The apparatus of claim 17, further comprising:
a lens coupled to the detecting means and configured to receive the light signal from the light sources.

19. The apparatus of claim 18, further comprising:
a fiber optic link coupled to the lens and to the detecting means and configured for transmitting the light signal from the lens to the detecting means.

* * * * *